(12) United States Patent
McKinnon, Jr.

(10) Patent No.: US 7,500,578 B1
(45) Date of Patent: Mar. 10, 2009

(54) METER BOX LID

(76) Inventor: Robert McKinnon, Jr., P.O. Box 648, Bedford, TX (US) 76021-0648

( * ) Notice: Subject to any disclaimer, the term of this patent is extended or adjusted under 35 U.S.C. 154(b) by 579 days.

(21) Appl. No.: 09/579,630

(22) Filed: May 26, 2000

(51) Int. Cl.
B65D 88/76 (2006.01)
B65D 43/04 (2006.01)
B65D 90/10 (2006.01)

(52) U.S. Cl. ......................... 220/484; 220/782; 220/787

(58) Field of Classification Search ................. 220/3.8, 220/3.2, 3.94, 3.5, 3.6, 4.02, 484, 780, 782, 220/784, 608, 789, 788, 786, 787; D10/103
See application file for complete search history.

(56) References Cited

U.S. PATENT DOCUMENTS

| | | | |
|---|---|---|---|
| 2,883,853 A | | 4/1959 | Forni |
| 3,263,853 A | * | 8/1966 | Smith ......................... 220/484 |
| 3,268,636 A | | 8/1966 | Angell, Jr. |
| 3,417,894 A | * | 12/1968 | Gittler ....................... 220/4.24 |
| 3,436,446 A | | 4/1969 | Angell, Jr. |
| 3,858,755 A | | 1/1975 | Tellen |
| 3,921,449 A | * | 11/1975 | Hauffe et al. ................. 73/273 |
| 3,979,007 A | * | 9/1976 | Thornbloom, Jr. .......... 220/522 |
| 4,163,503 A | | 8/1979 | McKinnon |
| 4,279,354 A | * | 7/1981 | Conti ...................... 220/23.83 |
| 4,302,499 A | * | 11/1981 | Grisch ........................ 442/268 |
| 4,368,674 A | * | 1/1983 | Wiens et al. ........... 105/377.01 |
| 4,518,097 A | * | 5/1985 | Milton et al. ................ 220/782 |
| 4,669,305 A | * | 6/1987 | Rivero-Olmedo ............ 73/201 |
| 4,726,490 A | | 2/1988 | Bonnema et al. |
| 4,809,548 A | * | 3/1989 | Rivero-Olmedo ............ 73/201 |
| 4,872,575 A | * | 10/1989 | Kobilan ....................... 220/3.3 |
| 5,016,756 A | * | 5/1991 | Wischhusen et al. ........ 206/545 |
| 5,111,938 A | * | 5/1992 | Soprano et al. .............. 206/386 |
| 5,123,776 A | | 6/1992 | Lang et al. |
| 5,139,845 A | * | 8/1992 | Beckerman et al. ......... 428/117 |
| 5,305,568 A | * | 4/1994 | Beckerman ................ 52/309.4 |
| 5,312,202 A | | 5/1994 | Newton |
| 5,358,133 A | | 10/1994 | Gillispie et al. |
| 5,394,601 A | | 3/1995 | Sutton |
| 5,423,448 A | | 6/1995 | Pedigo |
| 5,544,974 A | * | 8/1996 | Berg et al. .................. 220/4.12 |
| 5,545,559 A | * | 8/1996 | Kariniemi ................... 220/484 |
| 5,564,586 A | * | 10/1996 | Goodwin ..................... 220/844 |
| 5,641,090 A | * | 6/1997 | Kowalski et al. ............ 220/782 |
| 5,671,846 A | * | 9/1997 | Frank .......................... 206/541 |
| 5,685,452 A | * | 11/1997 | Kristoffersson ............. 220/608 |
| 5,723,192 A | * | 3/1998 | Jonasz ....................... 428/64.1 |
| 5,791,098 A | | 8/1998 | Thomas |
| 5,881,880 A | * | 3/1999 | Jacques et al. .............. 206/518 |
| 6,047,841 A | * | 4/2000 | Chen ............................ 220/7 |
| 6,706,366 B2 | * | 3/2004 | Meyer et al. ................ 428/156 |
| 6,742,460 B2 | * | 6/2004 | Meyer et al. ............. 108/57.25 |

* cited by examiner

*Primary Examiner*—Anthony D Stashick
*Assistant Examiner*—Niki M Eloshway
(74) *Attorney, Agent, or Firm*—Geoffrey A. Mantooth

(57) ABSTRACT

The lid is used to cover a utility box which houses a meter such as a water meter. The lid is compression molded from a plastic material such as medium density polyethylene, and has a planar upper surface and a planar lower surface. A plurality of generally parallel spaced apart recesses are formed in the lower surface. The recesses are spaced inward of the outer edges of the lid and have lengths equal to a substantial portion of the length of the lid along which the recesses extend. The area of the lower surface of the lid is greater than the total area of the recesses in the plane of the lower surface.

54 Claims, 5 Drawing Sheets

FIG. 9
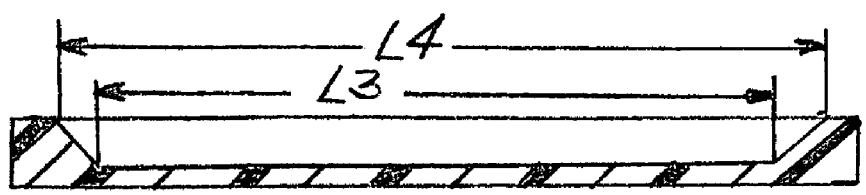
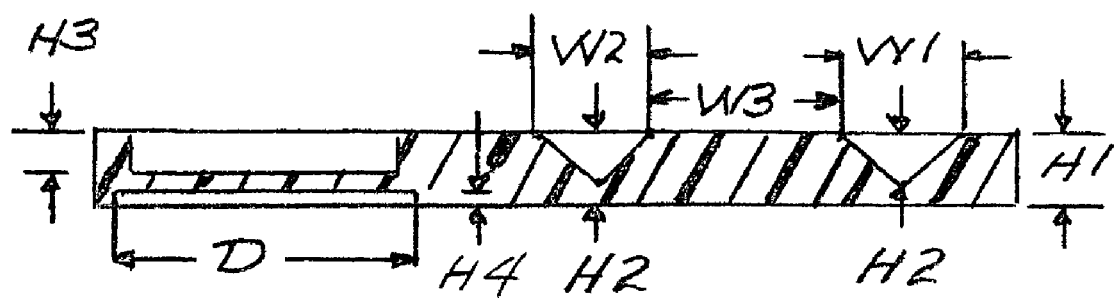
FIG. 10

METER BOX LID

BACKGROUND OF THE INVENTION

1. Field of the Invention

The invention relates to a removable lid for covering a utility box such as a water meter box.

2. Description of the Prior Art

In the past, utility boxes such as water meter boxes have been made of concrete or plastic with lids formed of the same material. U.S. Pat. Nos. 2,883,853, 4,163,503, 4,726,490, 5,423,448, 5,394,601, and 5,791,098 disclose different types of lids.

SUMMARY OF THE INVENTION

It is an object of the invention to provide a new and useful, strong, heavy duty lid for a utility box and which may be used on concrete or plastic boxes. The lid comprises a member formed of a plastic material with elongated recesses formed in the lower surface which minimizes breakage of the lid. The recesses are spaced inward of the outer edges of the lid member. The recesses are generally parallel to each other and have lengths equal to a substantial portion of the length of the lid along which the recesses extend.

BRIEF DESCRIPTION OF THE DRAWINGS

FIG. 9 is a cross-sectional view of FIG. 2 taken along lines 9-9 thereof.

FIG. 10 is a cross-sectional view of FIG. 2 taken along lines 10-10 thereof.

DESCRIPTION OF THE PREFERRED EMBODIMENTS

Figure 1:
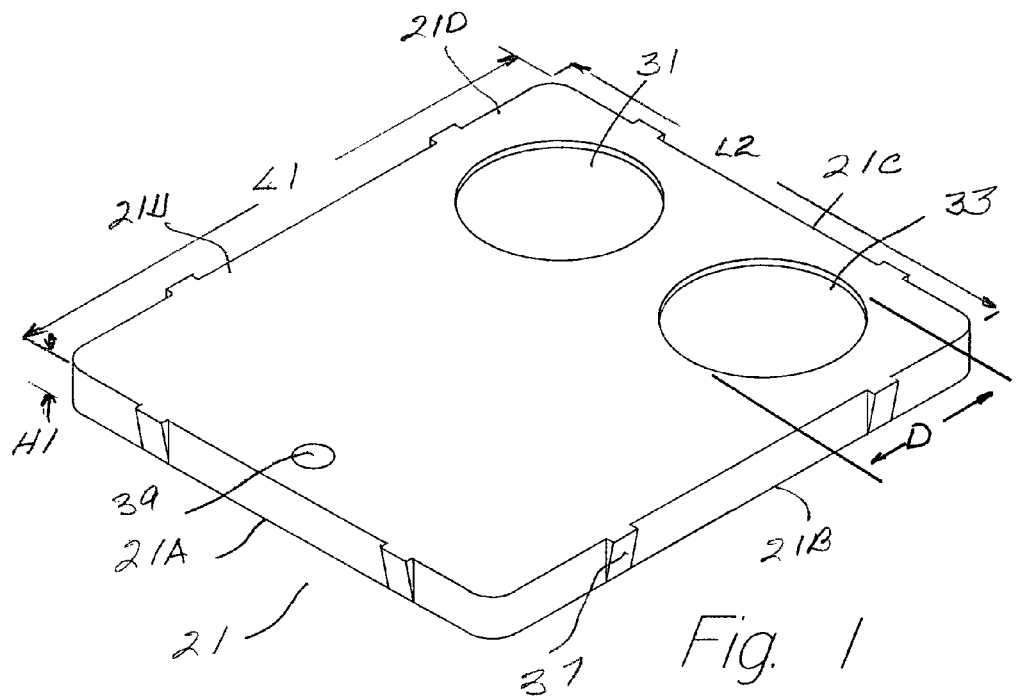
FIG. 1 illustrates the upper side of one of the lids of the invention.
Figure 2:
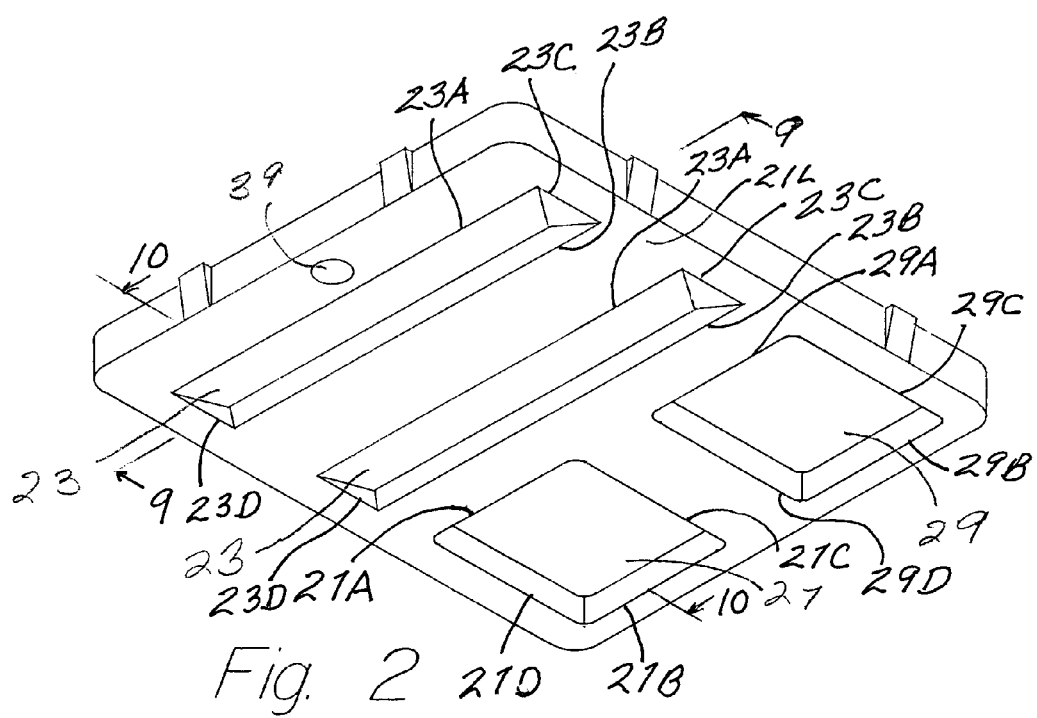
FIG. 2 illustrates the lower side of the lid of FIG. 1.

Referring now to the drawings there is shown four lids 21, 21M, 61, and 61M which are compression molded from a suitable plastic material such as medium density polyethylene. Referring to FIGS. 1, 2, 9 and 10, the lid 21 comprises an upper side having a flat or planar upper surface 21U and a lower side having a flat or planar lower surface 21L. The upper and lower sides are rectangular with four edges 21A, 21B, 21C, and 21D. Formed in the lower surface 21L during the molding operation are two identical elongated, parallel recesses 23 and two identical, square recesses 27 and 29. The recesses 23 have outer edge 23A, 23B, 23C, 23D. The recess 27 has outer edges 27A, 27B, 27C, 27D. The recess 29 has outer edges 29A, 29B, 29C, 29D. Formed in the upper surface 21U during the molding process are two identical, circular recesses 31 and 33 which are generally aligned with the two square recesses 27 and 29 respectively. Also formed on each edge 21A, 21B, 21C and 21D are two spaced apart wedges 37 or lugs which extend outward from the upper surface 21U and taper downward to the lower surface 21L. The wedges 37 may be shaved or cut to the desired shape in order to allow the lid to fit into the top opening of the utility box. Also molded or drilled through the lid 21 is a finger hole 39 for gripping purposes to more easily allow the lid to be fitted to or removed from the utility box.

The purpose of the recesses 23 is to minimize breakage of the lid and the purpose of the recesses 27, 29 and 31, 33 is to receive remote reading equipment in the interior of the utility box and on the top of the lid 21. Apertures will be formed through the lid to provide an opening between the recesses 27 and 31 and to provide an opening between recesses 29 and 33 to allow connection between the interior and exterior equipment.

In one embodiment, the dimensions L1, L2, L3, L4, H1, H2, H3, H4, W1, W2, W3 and D in inches are about 16½, 14½, 10½, 12½, 1½, 1, 14/16, ¼, 2, 2½, 4¾, and 5 respectively.

Lids similar to lid 21 were produced but they did not have the recesses 23. If these lids were dropped on a hard surface, the lids would crack in some instances. Also when a high vertical pressure was applied to the lids when they were supported at the outer edges, they would break. The problem was solved however, by forming the recesses 23 during the molding process. The lid of FIGS. 1, 2, 9, 10 was tested by dropping it on a hard surface and by applying a high pressure to its upper surface 21U with the outer edges of its lower surface 21L supported by means and the lid did not crack or break. It is believed that the improved results were obtained since the recesses 23 allowed a better heat transfer of the hot flowable plastic during the molding process and they enhanced curing of the plastic. The recesses 27 and 29 have solved the prior problem at least on the side of the lid on which they are located. The area of the lower surface 21L is greater than the total area of the recesses 23, 27, and 29 in the plane of the surface 21L.

Figure 3:
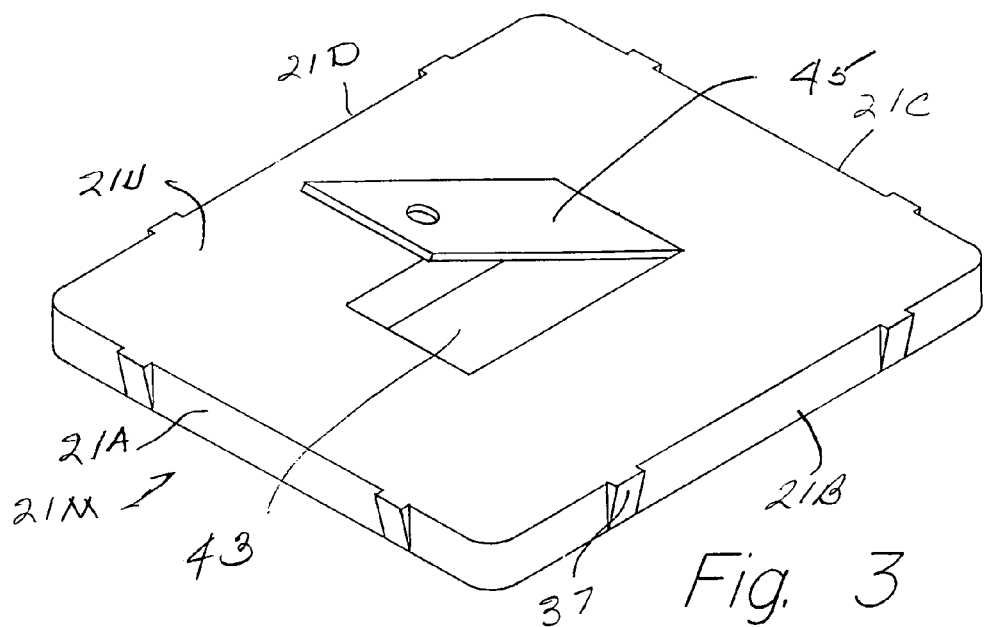
FIG. 3 illustrates the upper side of another lid of the invention.
Figure 4:
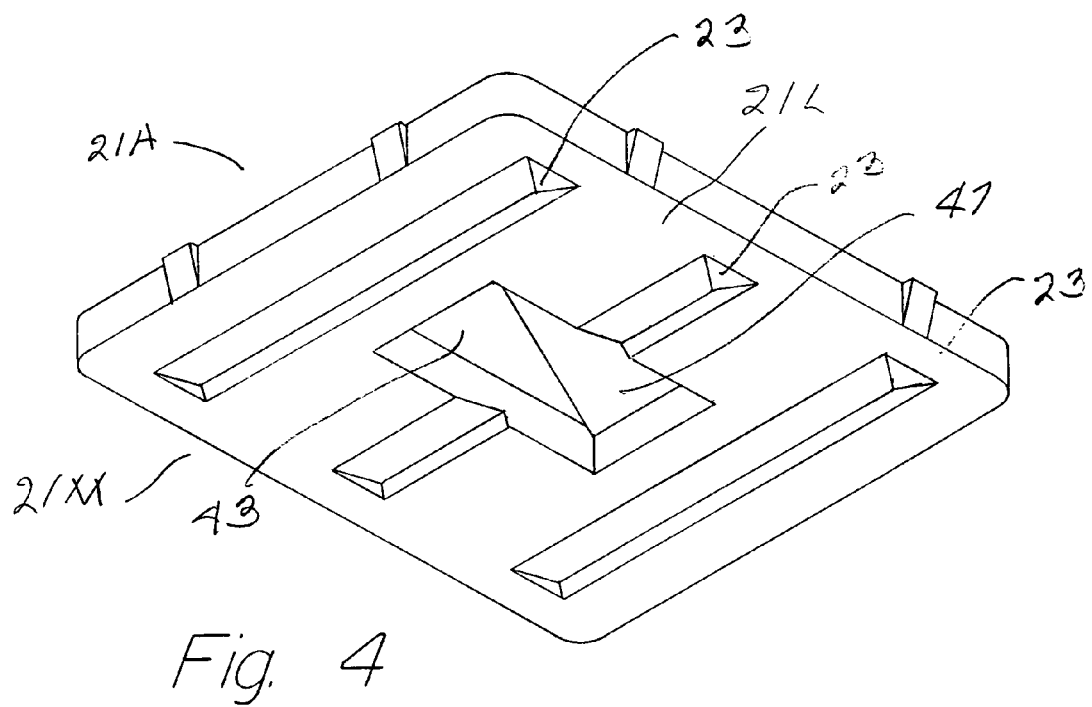
FIG. 4 illustrates the lower side of the lid of FIG. 3.

Referring to FIGS. 3 and 4, the lid 21M is similar to lid 21 except that it does not have recesses 27, 29, 31, 33; or the opening 39; it has an opening 43 formed through the lid at its central portion with a cover 45 hinged to the upper surface 21U to allow manual reading of the meter in the utility box and it has three identical excesses 23. In FIGS. 3 and 4, the same reference numerals as used in FIGS. 1, 2, 9, and 10 identify the same components and except for the differences mentioned above, the dimensions of lid 21M are the same as lid 21. Referring to FIG. 4, the outer recesses 23 are spaced about 2½ inches from the central recess 23. The opening 43 may have side dimensions in inches of 3¾×6⅞. The lid 21M is compression molded from a plastic material such as medium density polyethylene.

Figure 5:
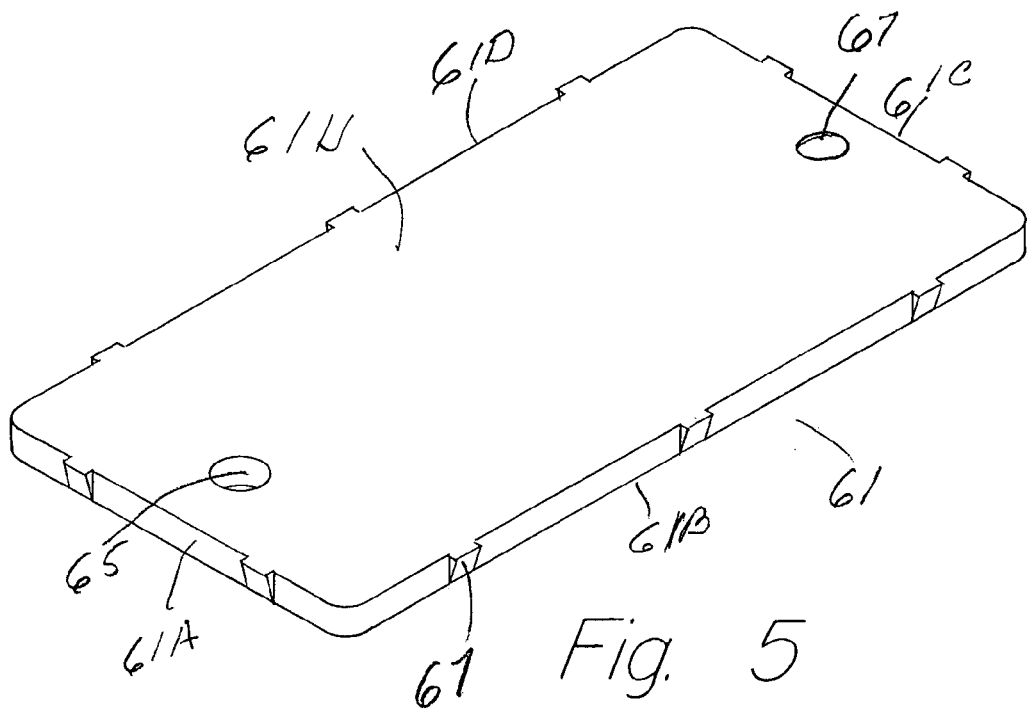
FIG. 5 illustrates the upper side of another lid of the invention.
Figure 6:
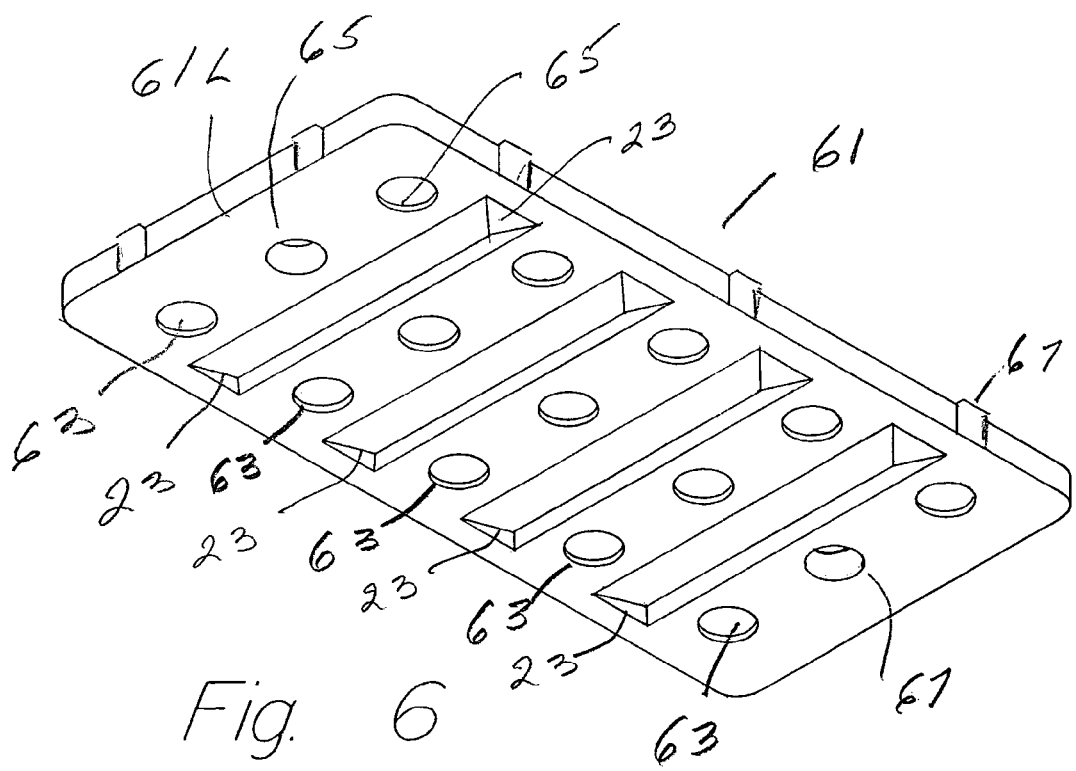
FIG. 6 illustrates the lower side of the lid of FIG. 5.

Referring to FIGS. 5 and 6, the lid 61 is compression molded from a suitable plastic such as medium density polyethylene. It is similar to lid 21M except that it is longer; it does not have the central opening 43; it has 4 spaced recesses 23 and five spaced rows of circular recesses 63 in its lower side. The lid 61 has a flat or planar upper surface 61U, a flat or planar lower surface 61L; edges 61A, 61B, 61C, 61D; and wedges 67. The length, width, and height of the lid 61 in inches may be 26½, 15, and 1½ respectively. The recesses 23 have the same dimensions as recesses 23 of FIGS. 1 and 2. In the embodiment of FIGS. 5 and 6, adjacent recesses 23 may be spaced 3 inches apart. The round recesses 63 may have a diameter of 2¼ of an inch and a depth of ¾ of an inch. Recesses 63 help perform the function of recesses 23.

Apertures 65 and 67 extend through the lid 61 and are used as a touch read hole for use for reading the meter in the box and as a finger hole respectively.

Figure 7:
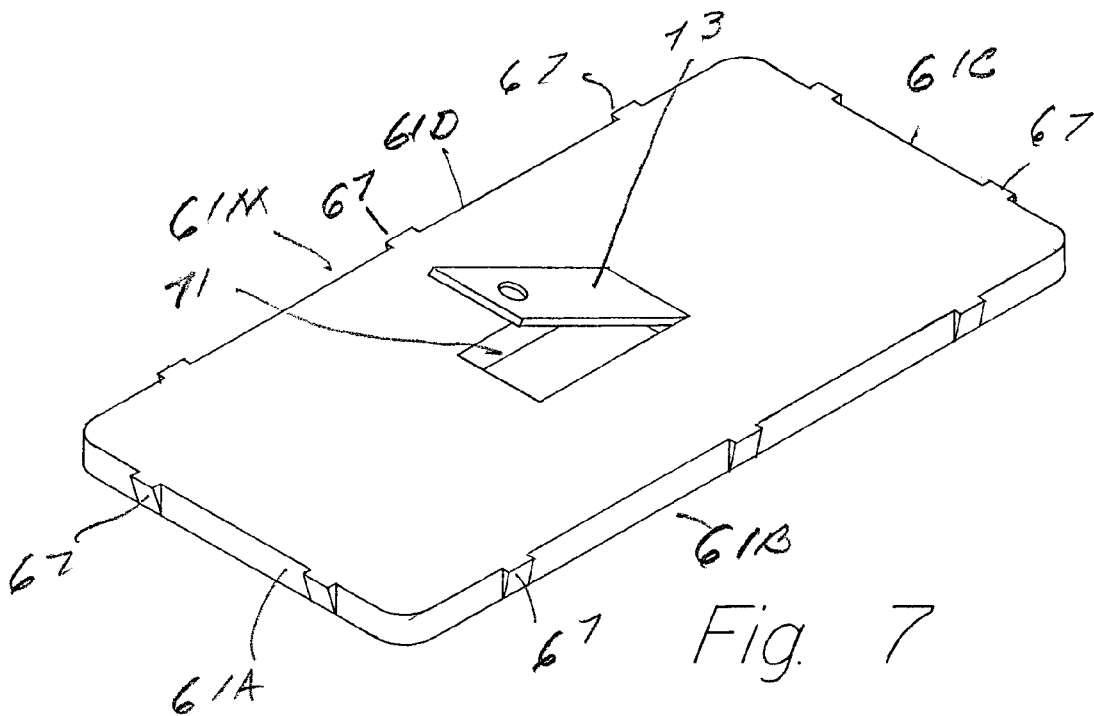
FIG. 7 illustrates the upper side of another lid of the invention.
Figure 8:
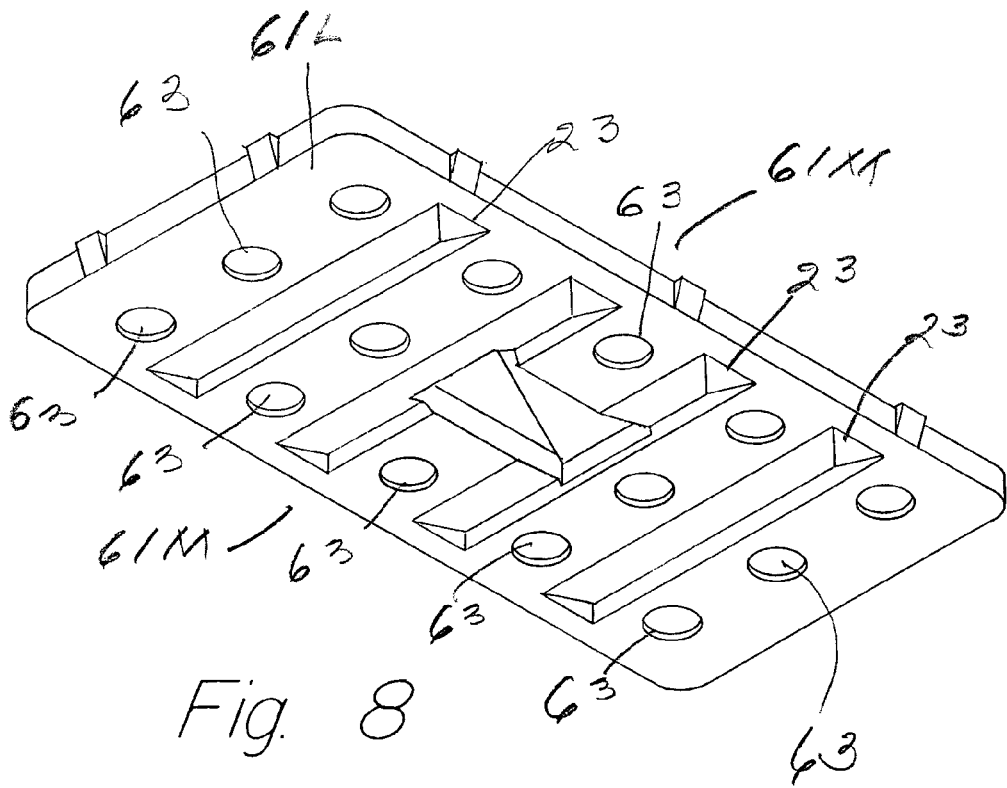
FIG. 8 illustrates the lower side of the lid of FIG. 7.

Referring to FIGS. 7 and 8, the lid 61M is compression molded from a suitable plastic material such as medium density polyethylene. The lid 61M is similar to the lid 61 except that it has a central opening 71 with a hinged cover 73 for use for manual reading of the meter in the box. Apertures 65 and 67 are not employed and have in their place two circular recesses 63. In FIGS. 7 and 8, the same reference numerals identify the same components as shown in FIGS. 5 and 6. The dimension of the lid 61M may be the same as those of lid 61.

In the embodiment of FIGS. 1-10 the lengths of the recesses 23 are equal to a substantial portion of the length of the lid along which the recesses extend and are greater than one half of said lengths of the lid and are a little greater than ¾ of said lengths of the lid. For each lid, the area of the lower surface also is greater than the total area of the recesses 23 in the plane of the lower surfaces of the lid.

The median density range of the polyethylene used in forming the lids of FIGS. 1-10 is 0.938-0.942.

Compression load tests were carried out on the lid of FIGS. 1-6, 9, 10 and on the lid of FIGS. 7 and 8. The tests were performed utilizing a 9"×9" steel plate placed on the lid center. Prior to testing, each sample was placed on steel blocks around the perimeter of the lid to simulate the lip of the meter box.

Tests were performed on three lids of the embodiment of FIGS. 1-6, 9, 10. The three lids tested withstood a total load in pounds of 9380; 12,230; 8,910, respectively.

The lid of FIGS. 7 and 8 had a length of 26 inches and a width similar to that of lid 61. Tests were performed on two lids of the embodiment of FIGS. 7 and 8. The two lids tested withstood a total load in pounds of 14,070; 12,070, respectively.

It appears that the lid of FIGS. 7 and 8 withstood a greater load since it did not have the recesses 27, 29, 31, 33 of the lid of FIGS. 1-6, 9, 10.

The lids described with respect to FIGS. 1-10 are all rectangular in shape. The plastic lids however may be circular or oblong in shape with planar upper and lower surfaces. All of these lids will have at least two parallel recesses 23 formed in their lower surfaces. The lengths of the recesses 23 will be equal to a substantial portion of the length of the lid along which the recesses extend and greater than one half of said length of the lids. In addition, the area of the lower surface will be greater than the total area of the recesses 23 in the plane of the lower surfaces of the lid.

The invention claimed is:

1. A lid for a utility box comprising:
a compression molded solid member made only of plastic material and having spaced apart upper and lower sides and an outer edge,
said outer edge extends around said member next to said lower side and which faces outward of said member,
said lower side comprising a lower surface which is contiguous with said outer edge at least on two opposite sides of said outer edge,
a plurality of spaced apart recesses having outer edges at said lower surface which are spaced from said outer edge of said member such that said lower surface surrounds said outer edges of said recesses,
said recesses being formed during the molding process to enhance curing of the plastic material and hence the quality of the lid,
each of said recesses comprises a surface which extends from its said outer edges into said member,
the area of said lower surface being greater than the total area surrounded by said outer edges of said recesses,
said member of said lid has the strength sufficient to withstand a load of at least 8,000 pounds applied to the upper side when the lower side is supported by means placed around a perimeter of said member.

2. The lid of claim 1, wherein:
said lower surface is a generally planar surface,
said upper side is a generally planar upper surface,
a plurality of spaced apart wedges formed on said outer edge of said member which extend outward of said outer edge at said upper surface and taper toward said lower surface.

3. The lid of claim 1, wherein:
said outer edges of each of said recesses comprise two spaced apart elongated outer edges and two spaced apart shorter outer edges,
said elongated edges of said recesses are generally parallel with each other,
said member has a given dimension along which said elongated edges of said recesses extend,
the lengths of said elongated edges of said recesses are greater than one half of said given dimension of said member.

4. The lid of claim 3, wherein:
said outer edge of said member is rectangular in shape and comprises a first pair of spaced apart edges and a second pair of spaced apart edges with said first pair of edges being transverse to said second pair of edges,
said elongated edges of said recesses are generally parallel with said first pair of edges of said member.

5. The lid of claim 1, wherein:
said lower surface is generally a planar surface.

6. The lid of claim 1, wherein:
one of said plurality of recesses comprises two spaced apart elongated edges and two spaced apart shorter outer edges,
a second of said plurality of recesses has dimensions in two directions transverse to each other each of which is greater than the dimensions of said shorter outer edges of said one recess.

7. The lid of claim 6, wherein:
said member of said lid is a solid member molded solely from a plastic material,
said upper side comprises an upper surface,
an upper recess formed in said upper surface of said lid at least partially in alignment with said second recess.

8. The lid of claim 1, wherein:
said plurality of recesses comprises at least three recesses,
said outer edges of each of two of said plurality of recesses comprise two spaced apart elongated outer edges and two spaced apart shorter outer edges,
one of said plurality of recesses has dimensions in two directions transverse to each other which are greater than the dimensions of said shorter outer edges of either of said two recesses.

9. The lid of claim 1, wherein:
said member of said lid is molded solely from a single type of plastic material.

10. A lid for a utility box, comprising:
a compression molded solid member made only of plastic material and having spaced apart upper and lower sides and an outer edge,
said outer edge extends around said member next to said lower side and which faces outward of said member,
said lower side comprising a lower surface which is contiguous with said outer edge at least on two opposite sides of said outer edge, a plurality of spaced apart recesses having outer edges at said lower surface which are spaced from said outer edge of said member such that said lower surface surrounds said outer edges of said recesses, said recesses being formed during the molding process to enhance curing of the plastic material and hence the quality of the lid, each of said recesses comprises a surface which extends from its said outer edges into said member, said outer edges of each of said recesses comprise two spaced apart elongated outer edges and two spaced apart shorter outer edges, said elongated edges of said recesses are generally parallel with each other, said member has a given dimension along which said elongated edges of said recesses extend, the lengths of said elongated edges of said recesses are greater than one half of said given dimension of said member, said member of said lid has the strength sufficient to withstand a load of at least 8,000 pounds applied to said upper side when said lower side is supported by means placed around a perimeter of said member.

11. The lid of claim 10, wherein:

said outer edge of said member is rectangular in shape and comprises a first pair of spaced apart edges and a second pair of spaced apart edges with said first pair of edges being transverse to said second pair of edges, said elongated edges of said recesses are generally parallel with said first pair of edges of said member.

12. The lid of claim 10, wherein:

said lower surface is a generally planar surface, said upper side is a generally planar upper surface, a plurality of spaced apart wedges formed on said outer edge of said member which extend outward of said outer edge at said upper surface and taper toward said lower surface.

13. The lid of claim 10, wherein:

the area of said lower surface is greater than the total area surrounded by said outer edges of said recesses.

14. The lid of claim 10, wherein:

said lower surface is a generally planar surface.

15. The lid of claim 10, wherein:

said member of said lid is molded solely from a single type of plastic material.

16. A lid for a utility box, comprising:

a compression molded solid member made only of plastic material and having spaced apart upper and lower sides and an outer edge, said outer edge comprising a first pair of spaced apart outer edges which face in opposite directions from each other outward from said member and a second pair of spaced apart outer edges which face in opposite direction from each other outward from said member, said first pair of outer edges being transverse to said second pair of opposite edges, said lower side comprising a lower surface which extends to and is contiguous with said first and second pairs of outer edges, a plurality of spaced apart recesses formed in said lower surface and spaced from said outer edge of said lower surface and from said upper side, said recesses being formed during the molding process to enhance curing of the plastic material and hence the quality of the lid, one of said recesses comprising two spaced apart elongated edges and two spaced apart shorter edges, said lower surface having a given side dimension along which said elongated edges extend, the lengths of said elongated edges of said one recess are greater than one half of said given dimension of said surface, said member of said lid has the strength sufficient to withstand a load of at least 8,000 pounds applied to said upper side when said lower side is supported by means placed around a perimeter of said member.

17. The lid of claim 16, wherein:

a second of said plurality of recesses has dimensions in two directions transverse to each other each of which is greater than the dimensions of said shorter edges of said one recess.

18. The lid of claim 16, wherein:

said one recess comprises two generally flat surfaces extending along said two elongated edges respectively and which join each other along a line such that said two surfaces and a plane extending across said recess at said lower surface defines a triangle as seen in cross-sections transverse to said elongated edges with said line located between said upper and lower surfaces.

19. The lid of claim 18, wherein:

a second of said plurality of recesses has dimensions in two directions transverse to each other each of which is greater than the dimensions of said shorter edges of said one recess.

20. The lid of claim 19, wherein:

said line has opposite ends, said one recess comprises two triangular shaped surfaces extending from said shorter edges to said opposite ends of said line respectively such that, said two triangular shaped surfaces extend away from each other from said opposite ends of said line to said shorter edges respectively.

21. The lid of claim 16, wherein:

said member of said lid is molded solely from a single type of plastic material.

22. A lid for a utility box, comprising:

a compression molded solid member made only of a single type of plastic material and having spaced apart upper and lower sides and an outer edge, said outer edge comprising a first pair of spaced apart outer edges which face in opposite directions from each other outward from said member and a second pair of spaced apart outer edges which face in opposite direction from each other outward from said member, said first pair of outer edges being transverse to said second pair of opposite edges, said lower side comprising a lower surface which extends to and is contiguous with said first and second pairs of outer edges, first and second spaced apart recesses, generally parallel to each other, formed in said lower surface and spaced from said outer edge of said lower surface and from said upper side, said recesses being formed during the molding process to enhance curing of the plastic material and hence the quality of the lid, each of said first and second recesses comprising two spaced apart elongated edges and two spaced apart shorter edges with two generally flat surfaces extending along said two elongated edges respectively and which join each other along a line such that said two surfaces and a plane extending across said recess at said lower surface define a triangle as seen in cross-sections transverse to said elongated edges with said line located between said upper and lower surfaces, the dimensions of said lower surface between said first and second spaced apart recesses being greater than the dimensions of said shorter edges of either of said first and second recesses, said member of said lid has the strength sufficient to withstand a load of at least 8,000 pounds applied to the upper side when the lower side is supported by means placed around a perimeter of said member.

23. The lid of claim 22, comprising:

a third recess formed in said lower surface spaced from said first and second recesses and from said outer edge of said lower surface and having dimensions in two directions transverse to each other each of which is greater than the dimensions of said shorter edges of either of said first and second recesses.

24. The lid of claim 22, wherein:

said plastic material has a density range of 0.938-0.942.

25. A lid for a utility box, comprising:

a compression molded solid member made only of a single type of plastic material and having spaced apart upper and lower sides and an outer edge, said outer edge comprising a first pair of spaced apart outer edges which face in opposite directions from each other outward from said member and a second pair of spaced apart outer edges which face in opposite direction from each other outward from said member, said first pair of outer edges being transverse to said second pair of opposite edges, said lower side comprising a lower surface which extends to and is contiguous with said first and second pairs of outer edges, a plurality of spaced apart recesses formed in said lower surface and spaced from said outer edge of said lower surface and from said upper side, said recesses being formed during the molding process to enhance curing of the plastic material and hence the quality of the lid, one of said recesses comprising two spaced apart elongated edges and two spaced apart shorter edges, a second of said plurality of recesses has dimensions in two directions transverse to each other each of which is greater than the dimensions of said shorter edges of said one recess, said member of said lid has the strength sufficient to withstand a load of at least 8,000 pounds applied to said upper side when said lower side is supported by means placed around a perimeter of said member.

26. The lid of claim 25, wherein:

said plastic material has a density range of 0.938-0.942.

27. A lid for a utility box, comprising:

a compression molded solid member made only of a single type of plastic material and having spaced apart upper and lower sides and an outer edge, said outer edge extends around said member next to said lower side and which faces outward of said member, said lower side comprising a lower surface which is contiguous with said outer edge at least on two opposite sides of said outer edge, at least one recess formed in said lower surface and spaced from said outer edge of said lower surface and from said upper side, said one recess being formed during the molding process to enhance curing of the plastic material and hence the quality of the lid, said one recess comprising two spaced apart elongated edges and two spaced apart shorter edges with two generally flat surfaces extending along said two elongated edges respectively and which join each other along a line such that said two surfaces and a plane extending across said recess at said lower surface define a triangle as seen in cross-sections transverse to said elongated edges with said line located between said upper and lower surfaces, said lower side having a given dimension along which said elongated edges of said recess extend, the lengths of each of said elongated edges are equal to a substantial portion of the length of said given dimension, said member of said lid has the strength sufficient to withstand a load of at least 8,000 pounds applied to the upper side when the lower side is supported by means placed around a perimeter of said member.

28. The lid of claim 27, wherein:

said line has opposite ends, said recess comprises two triangular shaped surfaces extending from said shorter edges to said opposite ends of said line respectively such that said two triangular shaped surfaces extend away from each other from said opposite ends of said line to said shorter edges respectively.

29. The lid of claim 28, wherein:

the lengths of each of said elongated edges of said recess are greater than one half of said given dimensions.

30. The lid of claim 27, wherein:

the lengths of each of said elongated edges of said recess are greater than one half of said given dimensions.

31. The lid of claim 27, comprising:

a second recess formed in said lower surface and spaced from said outer edge of said lower surface and from said upper side, said second recess has dimensions in two directions transverse to each other which are greater than the dimensions of said shorter edges of said one recess.

32. A lid for a utility box, comprising:

a compression molded solid member made only of a single type of plastic material and having spaced apart upper and lower sides and an outer edge, said outer edge comprising a first pair of spaced apart outer edges which face in opposite directions from each other outward from said member and a second pair of spaced apart outer edges which face in opposite direction from each other outward from said member, said first pair of outer edges being transverse to said second pair of opposite edges, said lower side comprising a lower surface which extends to and is contiguous with said first and second pairs of outer edges, first and second spaced apart recesses, generally parallel to each other, formed in said lower surface and spaced from said outer edge of said lower surface and from said upper side, said recesses being formed during the molding process to enhance curing of the material and hence the quality of the lid, each of said first and second recesses comprising two spaced apart elongated edges and two spaced apart shorter edges with two generally flat surfaces extending along said two elongated edges respectively and which join each other along a line such that said two surfaces and a plane extending across said recess at said lower surface define a triangle as seen in cross-sections transverse to said elongated edges with said line located between said upper and lower surfaces, said member of said lid has the strength sufficient to withstand a load of at least 8,000 pounds applied to the upper side when the lower side is supported by means placed around a perimeter of said member.

33. The lid of claim 32, wherein:
each of said lines has opposite ends,
each of said recesses comprises two triangular shaped surfaces extending from its said shorter edges to said opposite ends of its said line respectively such that said two triangular shaped surfaces extend away from each other from said opposite ends of said line to said shorter edges respectively.

34. The lid of claim 33, wherein:
the lengths of each of said elongated edges of said recess are greater than one half of said given dimension.

35. The lid of claim 32, wherein:
the lengths of each of said elongated edges of said recess are greater than one half of said given dimension.

36. The lid of claim 32, comprising:
a second recess formed in said lower surface and spaced from said outer edge of said lower surface and from said upper side,
said second recess has dimensions in two directions transverse to each other which are greater than the dimensions of said shorter edges of said recesses.

37. A lid for a utility box comprising:
a compression molded solid member made only of a plastic material and having spaced apart upper and lower sides and an outer edge,
said lower side comprising a lower surface,
a plurality of spaced apart recesses having outer edges at said lower surface which are spaced from said outer edge of said member such that said lower surface surrounds said outer edges of said recesses,
said recesses being formed during the molding process to enhance curing of the plastic material and hence the quality of the lid,
each of said recesses comprises a surface which extends from its said outer edges into said member,
the area of said lower surface being greater than the total area surrounded by said outer edges of said recesses,
said member of said lid has the strength sufficient to withstand a load of at least 8,000 pounds applied to the upper side when the lower side is supported by means placed around a perimeter of said member.

38. A lid for a utility box, comprising:
a compression molded solid member made only of a compressed plastic material and having spaced apart upper and lower sides and an outer edge,
said lower side comprising a lower surface,
a plurality of spaced apart recesses having outer edges at said lower surface which are spaced from said outer edge of said member such that said lower surface surrounds said outer edges of said recesses,
said recesses being formed during the molding process to enhance curing of the plastic material and hence the quality of the lid,
each of said recesses comprises a surface which extends from its said outer edges into said member,
said outer edges of each of said recesses comprise two spaced apart elongated outer edges and two spaced apart shorter outer edges,
said elongated edges of said recesses are generally parallel with each other,
said member has a given dimension along which said elongated edges of said recesses extend,
the lengths of said elongated edges of said recesses are greater than one half of said given dimension of said member,
said member of said lid has the strength sufficient to withstand a load of at least 8,000 pounds applied to said upper side when said lower side is supported by means placed around a perimeter of said member.

39. A lid for a utility box, comprising:
a compression molded solid member made only of a compressed plastic material and having spaced apart upper and lower sides,
said lower side comprising a lower surface having an outer edge,
a plurality of spaced apart recesses formed in said lower surface and spaced from said outer edge of said lower surface and from said upper side,
said recesses being formed during the molding process to enhance curing of the plastic material and hence the quality of the lid,
one of said recesses comprising two spaced apart elongated edges and two spaced apart shorter edges,
said lower surface having a given side dimension along which said elongated edges extend,
the lengths of said elongated edges of said one recess are greater than one half of said given dimension of said surface,
said member of said lid has the strength sufficient to withstand a load of at least 8,000 pounds applied to said upper side when said lower side is supported by means placed around a perimeter of said member.

40. A lid for a utility box, comprising:
a compression molded solid member made only of a compressed plastic material and having spaced apart upper and lower sides,
said lower side comprising a lower surface having an outer edge,
first and second spaced apart recesses, generally parallel to each other, formed in said lower surface and spaced from said outer edge of said lower surface and from said upper side,
said recesses being formed during the molding process to enhance curing of the plastic material and hence the quality of the lid,
each of said first and second recesses comprising two spaced apart elongated edges and two spaced apart shorter edges with two generally flat surfaces extending along said two elongated edges respectively and which join each other along a line such that said two surfaces and a plane extending across said recess at said lower surface define a triangle as seen in cross-sections transverse to said elongated edges with said line located between said upper and lower surfaces,
the dimensions of said lower surface between said first and second spaced apart recesses being greater than the dimensions of said shorter edges of either of said first and second recesses,
said member of said lid has the strength sufficient to withstand a load of at least 8,000 pounds applied to the upper side when the lower side is supported by means placed around a perimeter of said member.

41. A lid for a utility box, comprising:
a compression molded solid member made only of a compressed plastic material and having spaced apart upper and lower sides,
said lower side comprising a lower surface having an outer edge, a plurality of spaced apart recesses formed in said lower surface and spaced from said outer edge of said lower surface and from said upper side, said recesses being formed during the molding process to enhance curing of the plastic material and hence the quality of the lid, one of said recesses comprising two spaced apart elongated edges and two spaced apart shorter edges, a second of said plurality of recesses has dimensions in two directions transverse to each other each of which is greater than the dimensions of said shorter edges of said one recess, said member of said lid has the strength sufficient to withstand a load of at least 8,000 pounds applied to said upper side when said lower side is supported by means placed around a perimeter of said member.

42. A lid for a utility box, comprising:

a compression molded solid member made only of a compressed plastic material and having spaced apart upper and lower sides, said lower side comprising a lower surface having an outer edge, at least one recess formed in said lower surface and spaced from said outer edge of said lower surface and from said upper side, said one recess being formed during the molding process to enhance curing of the plastic material and hence the quality of the lid, said one recess comprising two spaced apart elongated edges and two spaced apart shorter edges with two generally flat surfaces extending along said two elongated edges respectively and which join each other along a line such that said two surfaces and a plane extending across said recess at said lower surface define a triangle as seen in cross-sections transverse to said elongated edges with said line located between said upper and lower surfaces, said member of said lid has the strength sufficient to withstand a load of at least 8,000 pounds applied to the upper side when the lower side is supported by means placed around a perimeter of said member.

43. The lid of claim 42, wherein:

said lower side has a dimension along which said elongated edges extend, the lengths of each of said elongated edges are equal to a substantial portion of the lengths of said given dimension.

44. A lid for a utility box, comprising:

a compression molded solid member made only of a compressed plastic material and having spaced apart upper and lower sides, said lower side comprising a lower surface having an outer edge, first and second spaced apart recesses, generally parallel to each other, formed in said lower surface and spaced from said outer edge of said lower surface and from said upper side, said recesses being formed during the molding process to enhance curing of the material and hence the quality of the lid, each of said first and second recesses comprising two spaced apart elongated edges and two spaced apart shorter edges with two generally flat surfaces extending along said two elongated edges respectively and which join each other along a line such that said two surfaces and a plane extending across said recess at said lower surface define a triangle as seen in cross-sections transverse to said elongated edges with said line located between said upper and lower surfaces, said member of said lid has the strength sufficient to withstand a load of at least 8,000 pounds applied to the upper side when the lower side is supported by means placed around a perimeter of said member.

45. A lid for a utility box, comprising:

a compression molded solid member made only of compressed plastic material having upper and lower sides and an outer edge;

a plurality of spaced apart recesses located in the lower side, the recesses having a depth which is the distance the recesses extend toward the other side;

the member having a thickness between the upper and lower side;

the depth of the recesses being no greater than two-thirds of the member thickness;

the member of the lid having the strength sufficient to withstand a load of at least 8000 pounds applied to the upper side when the lower side is supported by means placed around a perimeter of the member.

46. The lid of claim 45 wherein the member thickness is at least one and one-half inches.

47. The lid of claim 45 wherein the recesses are first recesses, the lid further comprising at least one remote reading equipment recess located in the lower side.

48. A lid for a utility box, comprising:

a compression molded solid member made only of compressed plastic material having upper and lower sides and an outer edge;

the lower side comprising a lower surface that is contiguous with portions of the outer edge;

a plurality of spaced apart recesses located in the lower side, the recesses having a depth which is the distance the recesses extend toward the upper side;

at least some of the recesses being spaced apart from adjacent recesses by a distance that is greater than the depth of the respective recesses;

the member of the lid having the strength sufficient to withstand a load of at least 8000 pounds applied to the upper side when the lower side is supported by a means placed around a perimeter of the member.

49. The lid of claim 48 wherein the member thickness is at least one and one-half inches.

50. A lid for a utility box, comprising:

a compression molded solid member made only of compressed plastic material having upper and lower sides and an outer edge;

the lower side comprising a lower surface that is contiguous with portions of the outer edge;

a plurality of spaced apart recesses located in the lower side, the recesses having a depth which is the distance the recesses extend toward the upper side;

the member having a thickness between the upper and lower sides of at least one and a half inches;

the member of the lid having the strength sufficient to withstand a load of at least 8000 pounds applied to the upper side when the lower side is supported by means placed around a perimeter of the member.

51. A lid for a utility box, comprising:

a compression molded solid member made only of compressed plastic material having spaced apart upper and lower sides, the lower side comprising a lower surface having an outer edge, at least one recess formed in the lower surface and spaced from the outer edge of the lower surface and from the upper side, the one recess formed during the molded process to enhance curing of the plastic material and hence the quality of the lid, said member of said lid has the strength sufficient to withstand a load of at least 8,000 pounds applied to the upper side when the lower side is supported by means placed around a perimeter of said member.

52. The lid of claim 51 wherein the member thickness is at least one and one half inches.

53. The lid of claim 51 wherein the recess is a remote reading equipment recess.

54. The lid of claim 51 wherein the member of the lid has the strength sufficient to withstand a load of at least 9,000 pounds applied to the upper side when the lower side is supported by means placed around the perimeter of the member.

* * * * *